(12) United States Patent
Bray et al.

(10) Patent No.: US 9,043,461 B2
(45) Date of Patent: *May 26, 2015

(54) FIREWALL EVENT REDUCTION FOR RULE USE COUNTING

(71) Applicant: International Business Machines Corporation, Armonk, NY (US)

(72) Inventors: Rory F. Bray, Rothesay (CA); Cezar P. Grzelak, Saint John (CA); Jason D. Keirstead, Fredericton (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/222,128

(22) Filed: Mar. 21, 2014

(65) Prior Publication Data

US 2014/0208412 A1    Jul. 24, 2014

Related U.S. Application Data

(63) Continuation of application No. 13/711,094, filed on Dec. 11, 2012.

(51) Int. Cl.
  *G06F 15/16*    (2006.01)
  *H04L 29/06*    (2006.01)
  (Continued)

(52) U.S. Cl.
  CPC .............. *H04L 63/02* (2013.01); *H04L 43/06* (2013.01); *H04L 63/0263* (2013.01); *H04L 45/48* (2013.01)

(58) Field of Classification Search
  CPC ..... H04L 29/06; H04L 43/06; H04L 63/0263; H04L 63/02

USPC .......................................................... 709/224
See application file for complete search history.

(56) References Cited

U.S. PATENT DOCUMENTS 6,606,710 B2   8/2003   Krishnan et al.
7,779,126 B1 *  8/2010   Cheriton ....................... 709/226
(Continued)

OTHER PUBLICATIONS

Author Unknown, Effective Solutions for Firewall Rule Cleanup: Using Athena FirePAC, White Paper, Nov. 20, 2009, pp. 1-4 (plus 2 citation pages added), Athena Security, Published online at: http://www.athenasecurity.net/pdf/FirePAC_rule_cleanup_whitepaper.pdf.

(Continued)

*Primary Examiner* — Tauqir Hussain
(74) *Attorney, Agent, or Firm* — Lee Law, PLLC; Christopher B. Lee

(57) ABSTRACT

An illustrative embodiment of a method for firewall rule use counting receives log messages comprising one or more log data sets from each firewall rule in a particular network whose counts are to be tracked in a log collector, generates a network trie for each reference database in a set of databases and a device source trie and a device destination trie for each firewall device in a plurality of devices of the particular network, a source port and protocol list and a destination port and protocol list for each respective device, a unique object for each log data set received; a mapping database comprising an entry for each log data set received associated with the unique object; and feeds each entry in the mapping database through a topology model to also generate a reference to a unique firewall rule on a respective device in the plurality of devices. A count associated with the unique firewall rule is incremented using a count of logs stored associated with the respective unique object and a report is generated.

7 Claims, 7 Drawing Sheets

(51) Int. Cl.
*H04L 12/26* (2006.01)
*H04L 12/753* (2013.01)

(56) References Cited

U.S. PATENT DOCUMENTS

| | | | |
|---|---|---|---|
| 8,418,240 B2 * | 4/2013 | Wool | 726/11 |
| 2004/0249812 A1 * | 12/2004 | Scoredos | 707/9 |
| 2008/0148382 A1 | 6/2008 | Bartholomy et al. | |
| 2008/0229088 A1 * | 9/2008 | Barth et al. | 713/1 |
| 2009/0172800 A1 | 7/2009 | Wool | |
| 2009/0198707 A1 | 8/2009 | Rohner | |
| 2010/0100954 A1 | 4/2010 | Yang | |

OTHER PUBLICATIONS

Bradley Mitchell, CIDR—Classless Inter-Domain Routing, Webpage/site, Printed from website on Dec. 5, 2012, p. 1, About.com, Published online at: http://compnetworking.about.com/cs/routingprotocols/g/bldef_cidr.htm.

Bradley Mitchell, CIDR—Classless Inter-Domain Routing: CIDR Notation and IP Tutorial, Webpage/site, Printed from website on Dec. 5, 2012, pp. 1-2, About.com, Published online at: http://compnetworking.about.com/od/workingwithipaddresses/a/cidr_notation.htm.

Tauqir Hussain, Examiner, United States Patent and Trademark Office, Office Action for U.S. Appl. No. 13/711,094, Sep. 24, 2014, pp. 1-20, Alexandria, VA, USA.

* cited by examiner

Firewall event reduction system
300

FIREWALL EVENT REDUCTION FOR RULE USE COUNTING

RELATED APPLICATIONS

This application is a continuation of and claims priority to and claims the benefit of U.S. patent application Ser. No. 13/711,094 titled "FIREWALL EVENT REDUCTION FOR RULE USE COUNTING," which was filed in the United States Patent and Trademark Office on Dec. 11, 2012, and which is incorporated herein by reference in its entirety.

BACKGROUND

1. Technical Field

This disclosure relates generally to computer system networks and network management in a data processing system and more specifically to firewall event reduction for rule use counting in managing the network of the data processing system.

2. Description of the Related Art

To monitor and manage networks, firewall administrators require knowledge of the frequency of the rules applied to devices being hit by traffic. The frequency information is useful for re-ordering and prioritizing rules for firewall optimization, detecting anomalous patterns due to rules firing more than expected and to issue reports demonstrating security policy compliance and security posture.

Traditionally, to determine a number of times a given firewall rule has been hit, the administrator must connect to each individual device in a network and view the rules on the device and a count of the rule hits. The manual process has several limitations. The process is time-consuming because the administrator must connect to each device one-by-one. Further for many devices when a rule-set is modified the modification re-sets the counter, regardless of whether the modification is material to the rule function. The administrator therefore must note the count before and after the rule change, denote the rules as being the same rule (even though they are different to the system) and summarize the counts in a report.

To reduce effort, firewall administrators typically use external tools to monitor and track use of firewall rules on a network. However, the tools routinely function in the same way because the tools communicate with a device on an interval and query the respective device for a count, and accordingly are subject to the same limitations as the previously described method with respect to detecting a rule as being the same although the system views the rule as modified. Gathering count information requires the monitoring system to connect to and query all the devices throughout the network, which is not always feasible.

In another example solution, some tools feed firewall rule logs into a system, which runs the logged events through a topological model created using a configuration of the firewalls, and count the rules, as the rules would be hit according to the model. However this example solution is not a real-time solution. Creating a real time solution would be very resource-intensive, because a centralized system must be able to process logs from all firewalls in the network through the topological model.

SUMMARY

According to one embodiment, a method for firewall rule use counting receives log messages comprising one or more log data sets from each firewall rule in a particular network whose counts are to be tracked in a log collector, generates a network trie for each reference database in a set of databases and a device source trie and a device destination trie for each firewall device in a plurality of devices of the particular network, a source port and protocol list and a destination port and protocol list for each respective device, a unique object for each log data set received; a mapping database comprising an entry for each log data set received associated with the unique object; and feeds each entry in the mapping database through a topology model to also generate a reference to a unique firewall rule on a respective device in the plurality of devices. A count associated with the unique firewall rule is incremented using a count of logs stored associated with the respective unique object and a report is generated.

According to another embodiment, a computer program product for firewall rule use counting comprises one or more computer recordable-type data storage devices containing computer executable program code stored thereon. The computer executable program code comprises computer executable program code for receiving log messages comprising one or more log data sets from each firewall rule in a particular network whose counts are to be tracked in a log collector; computer executable program code for generating a network trie for each reference database in a set of databases and a device source trie and a device destination trie for each firewall device in a plurality of devices of the particular network; computer executable program code for generating a source port and protocol list and a destination port and protocol list for each respective device in the plurality of devices; computer executable program code for generating a unique object for each log data set received; computer executable program code for generating a mapping database comprising an entry for each log data set received associated with the unique object; computer executable program code for feeding each entry in the mapping database through a topology model representative of the particular network; computer executable program code for generating a reference to a unique firewall rule on a respective device in the plurality of devices; computer executable program code for incrementing a count associated with the unique firewall rule using a count of logs stored associated with the respective unique object and computer executable program code for generating a report.

According to another embodiment, an apparatus for firewall rule use counting, comprises a communications fabric, one or more computer recordable data storage devices connected to the communications fabric, a memory connected to the communications fabric, wherein the memory contains computer executable program code, a communications unit connected to the communications fabric and one or more processors connected to the communications fabric. The one or more processors execute the computer executable program code to direct the apparatus to receive log messages comprising one or more log data sets from each firewall rule in a particular network whose counts are to be tracked in a log collector; generate a network trie for each reference database in a set of databases and a device source trie and a device destination trie for each firewall device in a plurality of devices of the particular network; generate a source port and protocol list and a destination port and protocol list for each respective device in the plurality of devices; generate a unique object for each log data set received; generate a mapping database comprising an entry for each log data set received associated with the unique object. The one or more processors further execute the computer executable program code to direct the apparatus to feed each entry in the mapping database through a topology model representative of the particular network; generate a reference to a unique firewall rule on a respective device in the plurality of devices; increment a count associated with the unique firewall rule using a count of logs stored associated with the respective unique object and generate a report.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
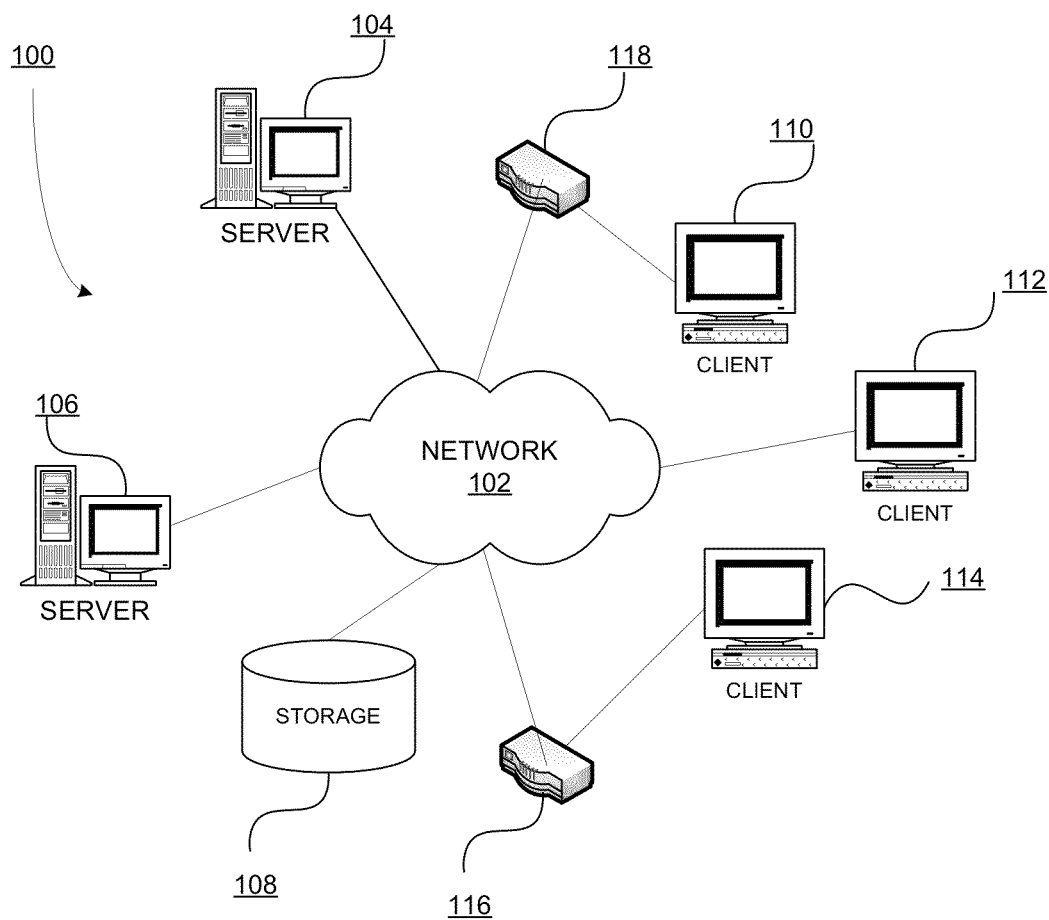
FIG. 1 is a block diagram of an exemplary network data processing system operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable data storage devices may be utilized. A computer-readable data storage device may be, for example, but not limited to, an electronic, magnetic, optical, or semiconductor system, apparatus, or device, or any suitable combination of the foregoing, but does not encompass propagation media. More specific examples (a non-exhaustive list) of the computer-readable data storage devices would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device or any suitable combination of the foregoing, but does not encompass propagation media. In the context of this document, a computer-readable data storage device may be any tangible device that can store a program for use by or in connection with an instruction execution system, apparatus, or device.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle Corporation, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable data storage device that can direct a computer or other programmable data processing apparatus to function in a particular manner, such that the instructions stored in the computer readable data storage device produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 2:
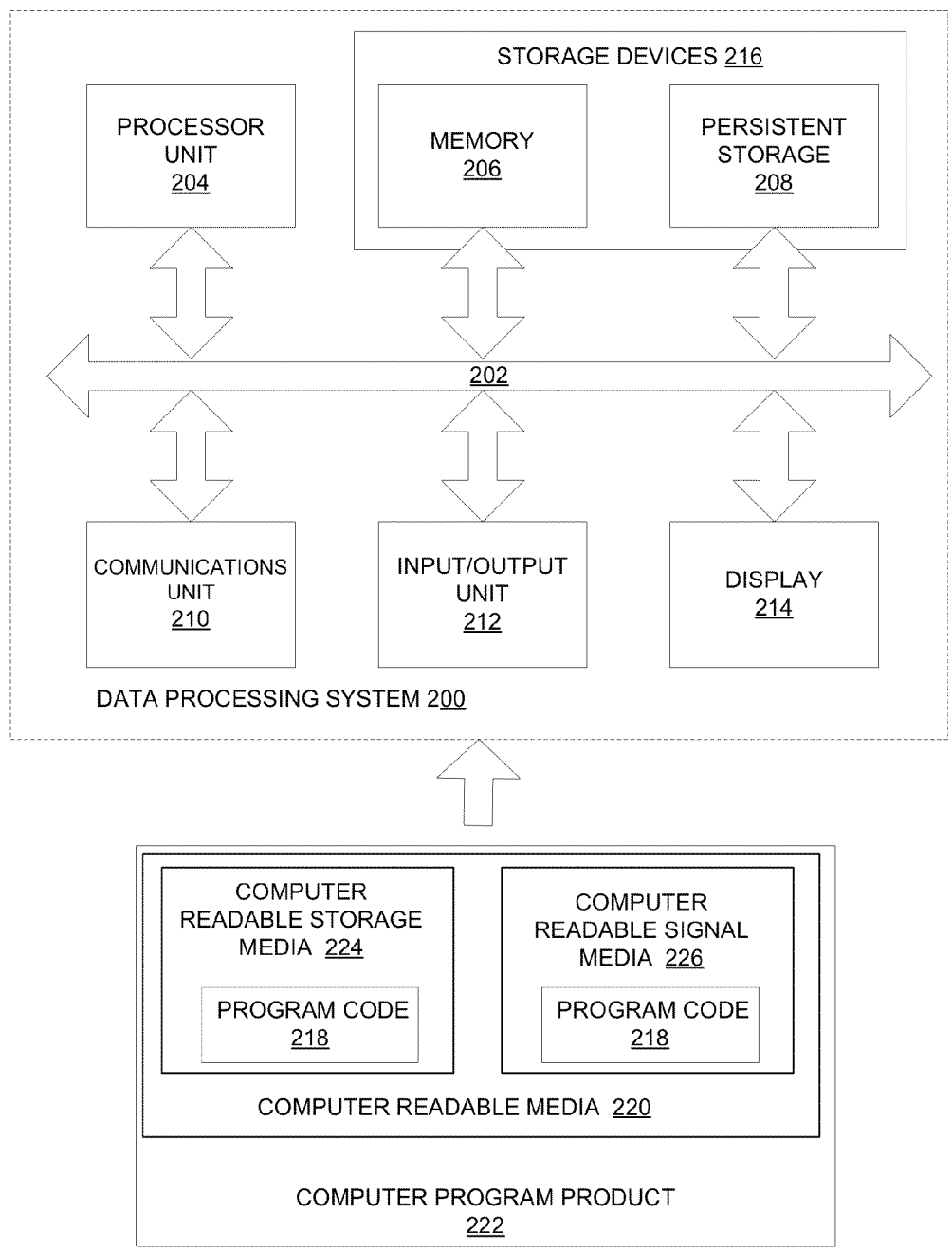
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102 with clients 110 and 114 connecting through router 118 and router 116 respectively. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Storage unit 108 provides a storage capability for collecting log information associated with router 118 and router 116 respectively. Network data processing system 100 may include additional servers, clients, and other devices not shown. Server 104 and server 106 provide a capability of operating a firewall event reduction system of the disclosure.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. For example, program instructions representative of a firewall event reduction system may be located in storage devices 216. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable storage media 220 form computer program product 222 in these examples. In one example, computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. The tangible form of computer readable storage media 220 is also referred to as computer recordable storage media or a computer readable data storage device. In some instances, computer readable storage media 220 may not be removable.

Alternatively, program code 218 may be transferred to data processing system 200 from computer readable storage media 220 through a communications link to communications unit 210 and/or through a connection to input/output unit 212. The communications link and/or the connection may be physical or wireless in the illustrative examples.

In some illustrative embodiments, program code 218 may be downloaded over a network to persistent storage 208 from another device or data processing system for use within data processing system 200. For instance, program code stored in a computer readable data storage device in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for firewall rule use counting is presented. One or more processors representative of processor unit 204 receives log messages comprising one or more log data sets from each firewall rule in a particular network, for example network 102 of network data processing system 100 of FIG. 1, for which counts are to be tracked in a log collector. Processor unit 204 generates a network trie for each reference database in a set of databases, a device source trie and a device destination trie for each firewall device in a plurality of devices of the particular network, a source port and protocol list and a destination port and protocol list for each respective device, a unique object for each log data set received and a mapping database comprising an entry for each log data set received associated with the unique object. The one or more processors submit each entry in the mapping database through a topology model to generate a reference to a unique firewall rule on a respective device in the plurality of devices. The one or more processors increment a count associated with the unique firewall rule using a count of logs stored associated with the respective unique object. The one or more processors generate a report including the use counts associated with each firewall rule use.

An embodiment of the disclosed process thus provides a data reduction and the server-side aggregation capability by which logs coming into a system can be collated in real-time according to a set of firewall rules and routing rules in use across a particular network, to attribute the logs to specific firewall rules by playing the log data through a topological model on a predetermined interval. By collating the logs according to the rules in use, a reduction in a size of the data, which must be processed, is attained enabling counting to be performed on a predetermined interval, to track use of each firewall rule on an aggregate basis.

Figure 3:
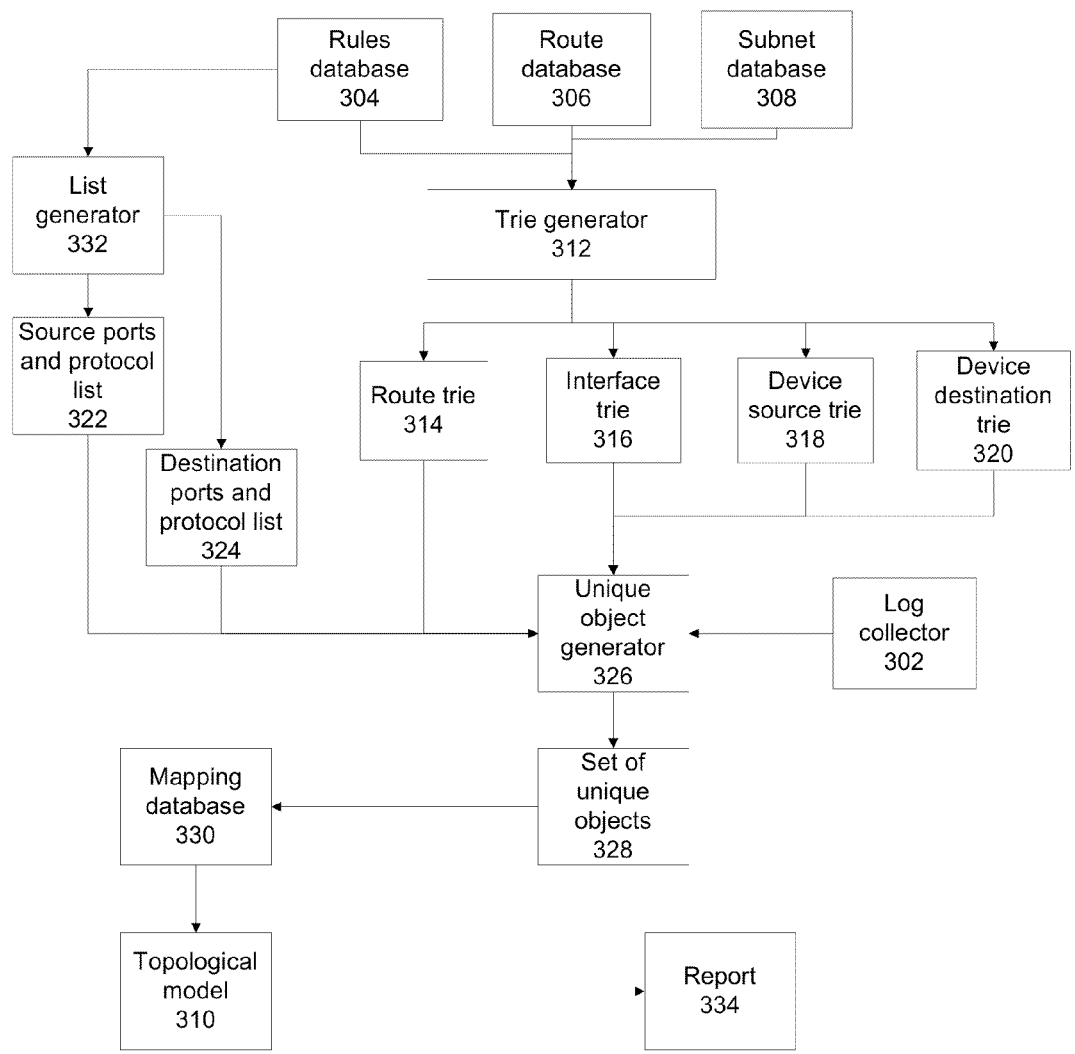
FIG. 3 is a block diagram of a firewall event reduction system operable for various embodiments of the disclosure.

With reference to FIG. 3 a block diagram of a firewall event reduction system operable for various embodiments of the disclosure is presented. Firewall event reduction system 300 is an example of a firewall event reduction system for firewall rule use counting of the disclosure.

Firewall event reduction system 300 leverages an existing data processing system such as network data processing system 100 of FIG. 1 or data processing system 200 of FIG. 2 in support of the receiving, storing, processing and providing output of the collected network information using the disclosed process. Firewall event reduction system 300 comprises a number of components, which may be implemented as functional components in a physical or logical manner without departure from the disclosed process capability. For example, some components may be combined with other components into a larger functional unit, without loss of capability, as required by a specific installation.

Log collector 302 provides a capability of receiving log messages (log data set) from each firewall rule whose counts are to be tracked. Log collector 302 may receive individual messages or messages also referred to as log data sets, from the firewall rules. The information received is stored and maintained for use in operation of other components of firewall event reduction system 300. Periodic refresh of the received logs provides a capability to accumulate information or replace previously obtained information representative of the log data.

Rule database 304 provides a capability of containing a record of all firewall rules from each firewall rule for which counts are to be tracked using firewall event reduction system 300. Route database 306 provides a capability of containing a record of all routing rules from each firewall and each router in a network for which analysis is desired. Subnet database 308 provides a capability of containing a record of all subnets used on the interfaces of each firewall and each router in the previously desired network.

Topological model 310 provides a capability of a model created using all routes, devices, and firewall rules on the desired network, such that a given IP packet constructed and fed into the respective model has a behavior as it would on the real network. The model is used in a process to identify references to unique rules on a given device in the desired network.

Trie generator 312 provides a capability to generate a set of network tries used in subsequent processing. Trie generator 312 reads all entries in routing database 306, rules database 304, and subnet database 308, and uses the entries to populate several respective network tries. A trie, or also referred to as a prefix tree, is a particular data structure organized as an ordered tree that may be used to store a dynamic set of data or an associative array in which the keys are usually strings. A position of a node in the tree defines the key with which the node is associated.

Trie generator 312, for each CIDR address used in a destination field of routes, generates a trie. This trie is called route trie 314. Interface trie 316 is generated for each CIDR address present in subnet database 308. For each firewall device, trie generator 312 generates two separate tries. Device source trie 318 is generated containing all CIDR addresses used in the sources of firewall rules for the respective device, and destination trie 320 containing all CIDR addresses used in the destination of firewall rules for the respective device.

CIDR is an acronym for Classless Inter-Domain Routing, or Classless Internet Domain Routing and was designed as a method for specifying Internet Protocol (IP) addresses to Internet routers. Prior to using CIDR, the Internet router devices used an IP addressing scheme that reserved large address blocks into classes Class A, Class B, or Class C and others that ineffectively used the IP address range.

CIDR was designed to eliminate use of the IP addressing space classes. CIDR accordingly associates a network mask with corresponding IP network numbers regardless of a previous conventional class. Router devices supporting CIDR recognize the defined networks as individual routes, although the network defined represents an aggregation of several traditional subnets.

CIDR notation comprises a concatenation of an IP address with an associated network mask in a form of a string xxx.xxx.xxx.xxx/n, where n is a value in a range 1 to 31 representing a number of 1-bits in a mask. For example, 192.168.12.0/23 applies a network mask of 255.255.254.0 to the 192.168 network, starting at 192.168.12.0. Accordingly the notation represents an address range of 192.168.12.0-192.168.13.255. Compared to the previous class-based networking, the CIDR notation of 192.168.12.0/23 represents an aggregation of two Class C subnets (as under the conventional class based networking) 192.168.12.0 and 192.168.13.0 each having a subnet mask of 255.255.255.0. Therefore the expression 192.168.12.0/23 is equivalent to 192.168.12.0/24+192.168.13.0/24 (Source: http://compnetworking.about.

com/cs/routingprotocols/g/bldef_cidr.htm and http://comp-networking.about.com/od/workingwithipaddresses/a/cidr_notation.htm)

Each of the generated tries may further be compressed into a respective trie representation by merging common branches because the information once generated in the particular trie is static for a predetermined period and subsequently used in a fast look up.

Unique object generator 326 provides a capability of generating set of unique objects 328 when unique object generator 326 reads all entries in the rules database 304, and generates for each firewall device a list of source ports and protocols 322 and for each corresponding firewall device a list of destination ports and protocols 324 that are used in rules of that particular device.

As each firewall log, or log data set, enters the system, a unique object in a set of unique objects 328 is created using attributes of a narrowest CIDR network of the results from a source IP address lookup in route trie 314, interface trie 316, and device source trie 318; a narrowest CIDR network of the results from the destination IP address lookup in route trie 314, interface trie 316, and device destination trie 320.

When the source port and/or protocol are present in the log being processed and are also present in list of source ports and protocols 322 used in rules for this device, then the source port and/or protocol are added to the unique object in the set of unique objects 328. Otherwise, a null value is assigned to the unique object in the set of unique objects 328. When the destination port and/or protocol are present in the log and are also present in the list of destination ports and protocols 324 used in rules for this device, then the destination port and/or protocol are added to the unique object in the set of unique objects 328. Otherwise, a null value is assigned to the unique object in the set of unique objects 328.

Mapping database 330 provides a capability of mapping the unique objects in set of unique objects 328 to log counts. Firewall event reduction system 300 determines, for each log data set being processed, whether a count of logs associated with a unique object in set of unique objects 328 exists. Responsive to a determination that the unique object in set of unique objects 328 exists, then a count of events associated with the unique object is incremented. Responsive to a determination that a count of events associated with a unique object in the set of unique objects 328 does not exist, then a count of events associated with the unique object is created.

On a predetermined interval, which is a configurable value, firewall event reduction system 300 reads all entries in mapping database 330 and feeds the entries into topological model 310. The result of feeding each entry through topological model 310 is report 334 providing a count of references to a unique firewall rule on a particular device. Firewall event reduction system 300 increments a count affiliated with the unique rule according to the count of logs stored in association with a particular unique identifier. Report 334 is a document describing a count of hits for each specified rule resulting from processing of the log information received.

Because the number of entries in mapping database 330 is collated based on defined CIDR networks in use on the desired network, the number of entries is typically significantly reduced compared to a number of firewall log entries entering firewall event reduction system 300. As such, firewall event reduction system 300 can typically process the received information in a reasonable time period using the described process.

Figure 4:
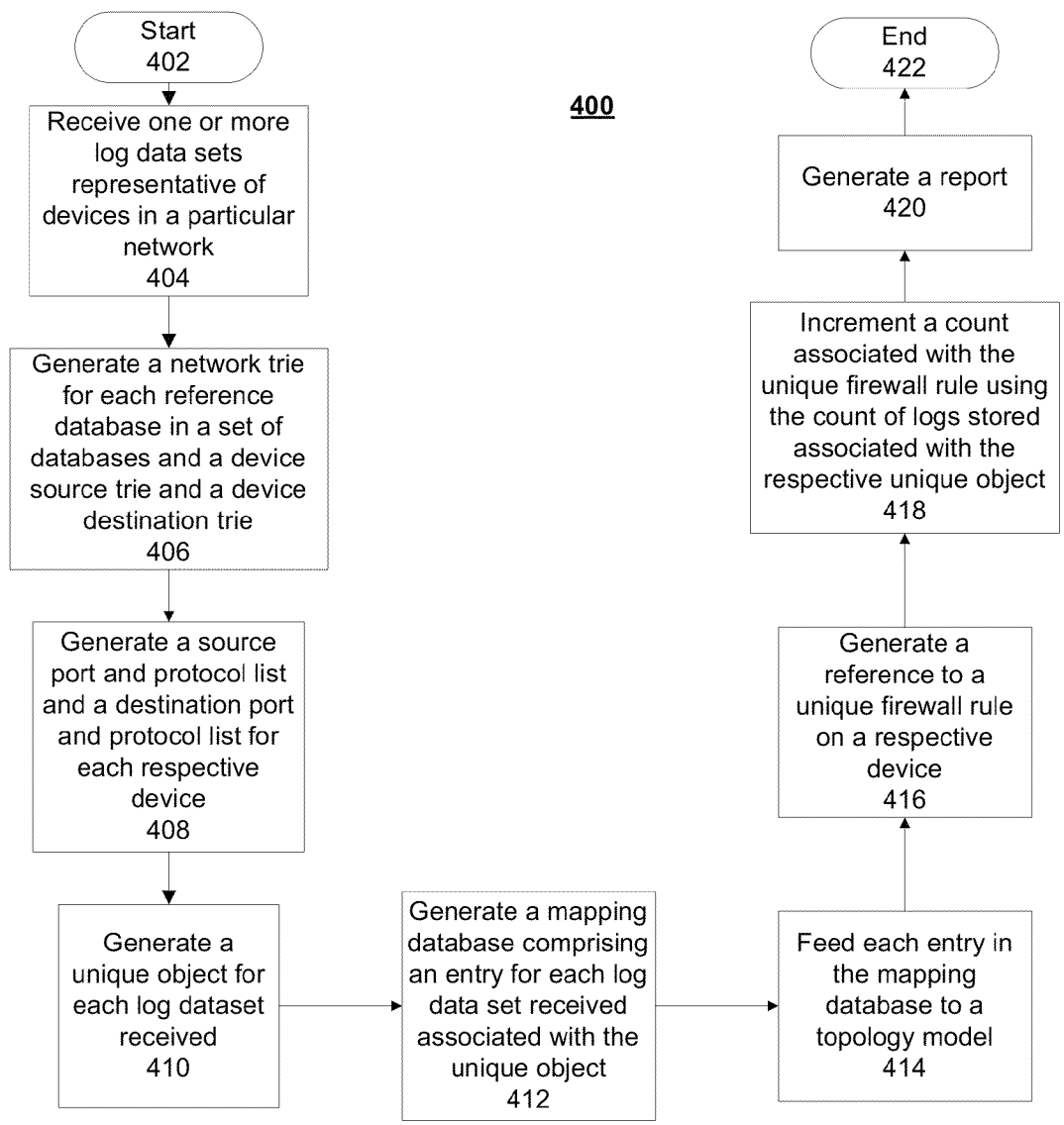
FIG. 4 a flowchart of a process for firewall event reduction for rule use counting using the firewall event reduction system of FIG. 3 for various embodiments of the disclosure.

With reference to FIG. 4 a flowchart of a process for firewall event reduction for rule use counting operable for various embodiments of the disclosure is presented. Process 400 is an example of a process used for firewall event reduction for rule use counting using firewall event reduction system 300 of FIG. 3.

Process 400 begins (step 402) and receives one or more log data sets (step 404). A log data set is representative of activity associated with a network device for which statistics have been gathered for analysis. For example, device statistics are captured at a particular device, including a router or a firewall device and sent to a log collector component. The collection activity can be initiated by the log collector or by an agent on the reporting device equally well. Usage information includes a number of times a particular rule was invoked at the particular device.

In preparation for the log data set analysis operations, process 400 generates a network trie for each respective reference database in a set of databases and a device source trie and a device destination trie (step 406). The databases typically used include a rules data base comprising a set of firewall rules containing one or more records of all firewall rules from each firewall rule for which counts are to be tracked, a route data base containing one or more records of all routing rules from each firewall and each router in a network for which analysis is desired, a subnet database containing one or more records of all subnets used on the interfaces of each firewall and each router in the desired network.

A trie generator generates a route trie for each CIDR address used in a destination field of routes; an interface trie for each CIDR address present in subnet database and for each firewall device, separate tries of a device source trie containing all CIDR addresses used in the sources of firewall rules for the respective device, and a destination trie containing all CIDR addresses used in the destination of firewall rules for the respective device. Generation of the network tries aids in reducing a volume of network information to process.

Process 400 generates a pair of lists comprising a source port and protocol list and a destination port and protocol list for each respective device (step 408). A source list and a destination list pairing is generated using the rules database of the firewall event reduction system for each respective device of the network of interest. Each list contains respective CIDR addresses reflective of the context of either a source or a destination.

Process 400 generates a unique object for each log dataset received (step 410). As each of the one or more log data sets (for example, firewall logs) enters the firewall event reduction system, a unique object in a set of unique objects is created using attributes of a narrowest CIDR network of the results from a source IP address lookup in the route trie, the interface trie, and the device source trie; a narrowest CIDR network of the results from the destination IP address lookup in route trie, the interface trie, and the device destination trie.

Further when a source port and/or protocol are present in the log data set being processed and are also present in the previously generated list of source ports and protocols used in rules for the respective device, then the source port and/or protocol are added to the unique object in set of unique objects. Otherwise, a null value is assigned to the unique object.

When a destination port and/or protocol is present in the log data sets and is also present in the list of destination ports and protocols used in the rules for this respective device, then the destination port and/or protocol are added to the unique object in the set of unique objects. Otherwise, as in the case with the source port and/or protocol, a null value is assigned to the unique object in the set of unique objects.

Process 400 generates a mapping database, which provides a mapping between unique objects in the set of unique objects to respective log counts (step 412). For each count of logs associated with a unique object identified, a respective count of events associated with the unique object is incremented. When a count of logs associated with a unique object in set of unique objects does not exist, then a count of events associated with the unique object is created.

On a predetermined interval, process 400 reads all entries in the mapping database and feeds each entry into a topological model (step 414). As a result of feeding each entry through the topological model process 400 generates a count of references to a unique firewall rule on a respective device (step 416). Process 400 increments a count associated with the unique firewall rule using the count of logs stored in association with a respective unique object. Process 400 generates a report, for example a document, describing a count of hits for each specified rule resulting from processing of the log data set information received (step 420) and terminates thereafter (step 422).

Figure 5:
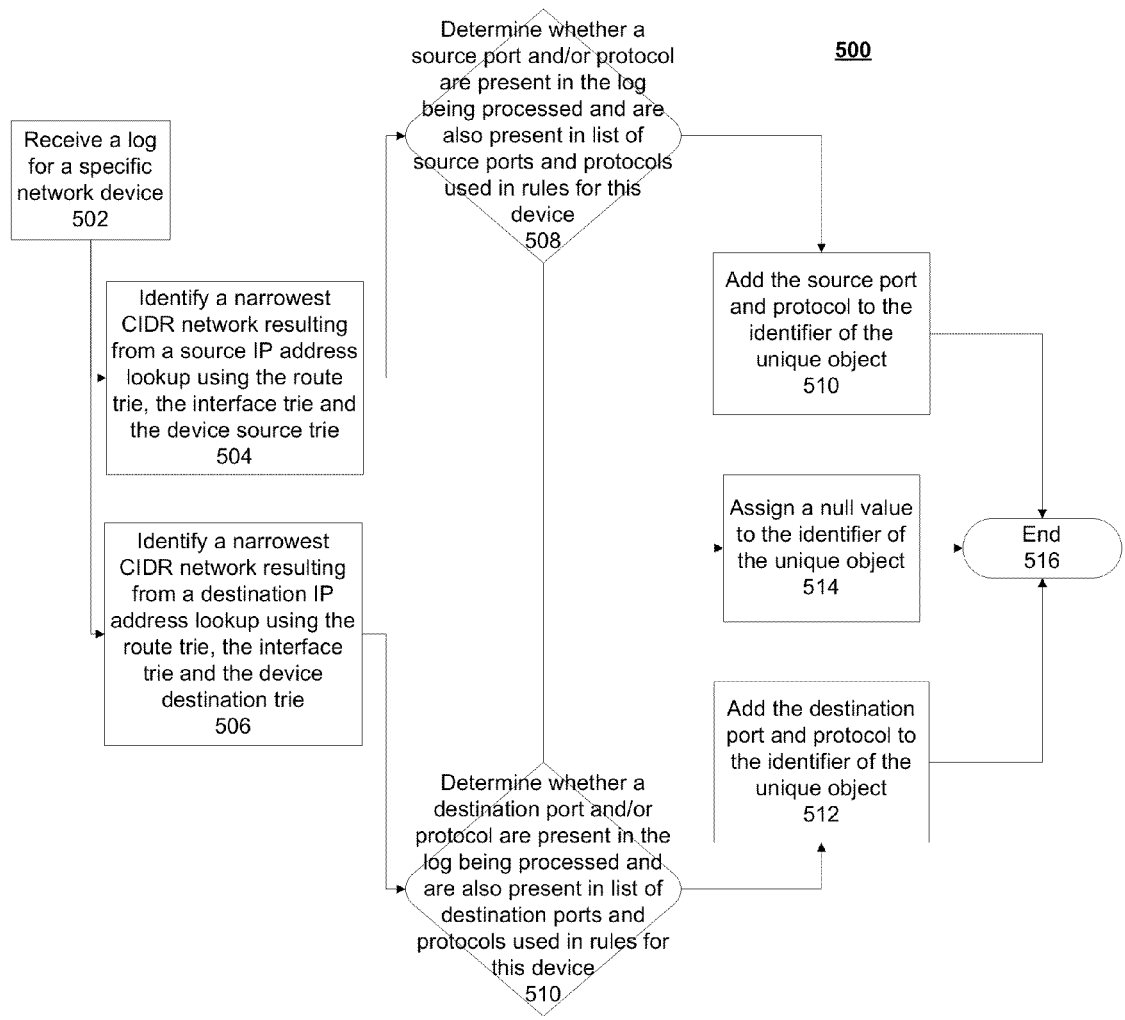
FIG. 5 is a flowchart of a process for generating a unique object using the firewall event reduction system of FIG. 3 for various embodiments of the disclosure.

With reference to FIG. 5 a flowchart of a process for generating a unique object operable for various embodiments of the disclosure is presented. Process 500 is an example of a process used for the generation of a unique object using process 400 of FIG. 4. The unique object is an intermediate form used to reduce the volume of log data for processing through a topology model.

Process 500 begins (step 502) and receives a log for specific network device (step 504). The log received is also referred to as a log data asset and contains one or more messages or statistics associated with activity of a particular network device for which information has been collected for analysis. Information collected at least includes occurrences of one or more rule hits on the respective device.

Process 500 identifies a narrowest CIDR network resulting from a source IP address lookup using a combination of the route trie, the interface trie and the device source trie (step 504). Process 500 identifies a narrowest CIDR network resulting from a destination IP address lookup using a combination of the route trie, the interface trie and the device destination trie (step 506).

Process 500 determines whether a source port and/or protocol are present in the log being processed and also present in list of source ports and protocols used in rules for this device (step 508). Responsive to a determination that the source port and/or protocol are present in the log being processed and also present in list of source ports and protocols used in rules for this device, process 500 adds the source port and protocol to the identifier of the unique object (step 510). However, responsive to a determination that the source port and/or protocol are either not present in the log being processed or not present in list of source ports and protocols used in rules for this device, process 500 assigns a null value to the identifier of the unique object (step 514) and terminates thereafter (step 516).

Process 500 determines whether a destination port and/or protocol are present in the log being processed and also present in list of destination ports and protocols used in rules for this device (step 510). Responsive to a determination that the destination port and/or protocol are present in the log being processed and also present in list of destination ports and protocols used in rules for this device, process 500 adds the destination port and protocol to the identifier of the unique object (step 512). However, responsive to a determination that the destination port and/or protocol are either not present in the log being processed or not present in list of destination ports and protocols used in rules for this device, process 500 assigns a null value to the identifier of the unique object (step 514) and terminates thereafter (step 516) as before.

Figure 6:
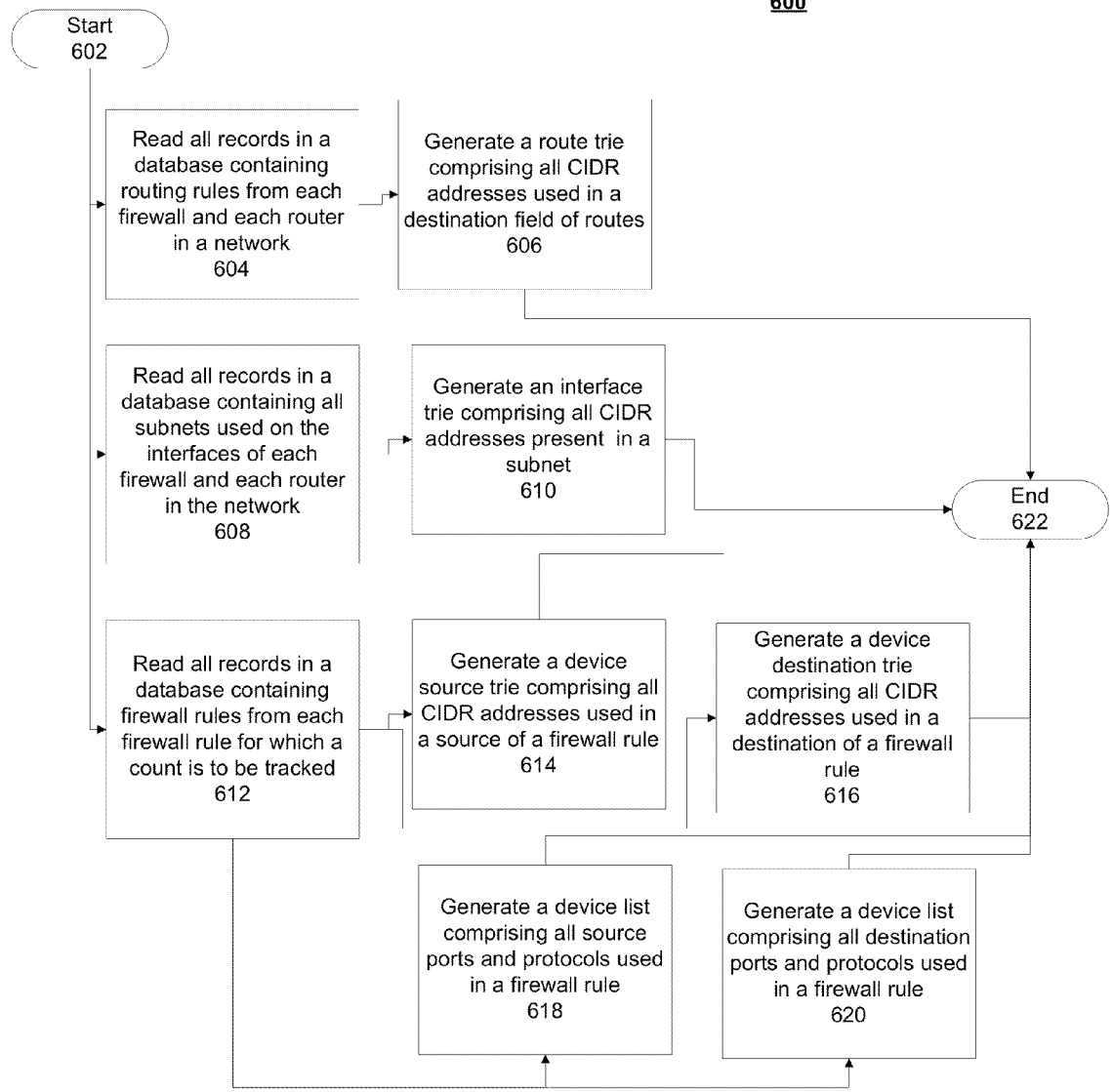
FIG. 6 is a flowchart of a process for generating network tries and device lists using the firewall event reduction system of FIG. 3 operable for various embodiments of the disclosure.

With reference to FIG. 6 a flowchart of a process for generating network tries and device lists operable for various embodiments of the disclosure is presented. Process 600 is an example of a process used for the generation of the network tries and device source and device destination lists using process 400 of FIG. 4.

Process 600 begins (step 602) and reads all records in a database containing routing rules from each firewall and each router in a network (step 604). Process 600 generates a route trie comprising all CIDR addresses used in a destination field of routes (step 606) and terminates thereafter (step 622).

Process 600 reads all records in a database containing all subnets used on the interfaces of each firewall and each router in the network (step 608). Process 600 generates an interface trie comprising all CIDR addresses used in a subnet (step 610) and terminates thereafter (step 622).

Process 600 reads all records in a database containing firewall rules from each firewall rule for which a count is to be tracked (step 612). Process 600 generates a device source trie comprising all CIDR addresses used in a source of a firewall rule (step 614). In a similar manner process 600 generates a corresponding device destination trie comprising all CIDR addresses used in a destination of a firewall rule (step 616) and terminates thereafter (step 622). Process 600 generates a device list comprising all source ports and protocols used in a firewall rule (step 618). Process 600 generates a device list comprising all destination ports and protocols used in a firewall rule (step 620) and terminates thereafter (step 622).

Figure 7:
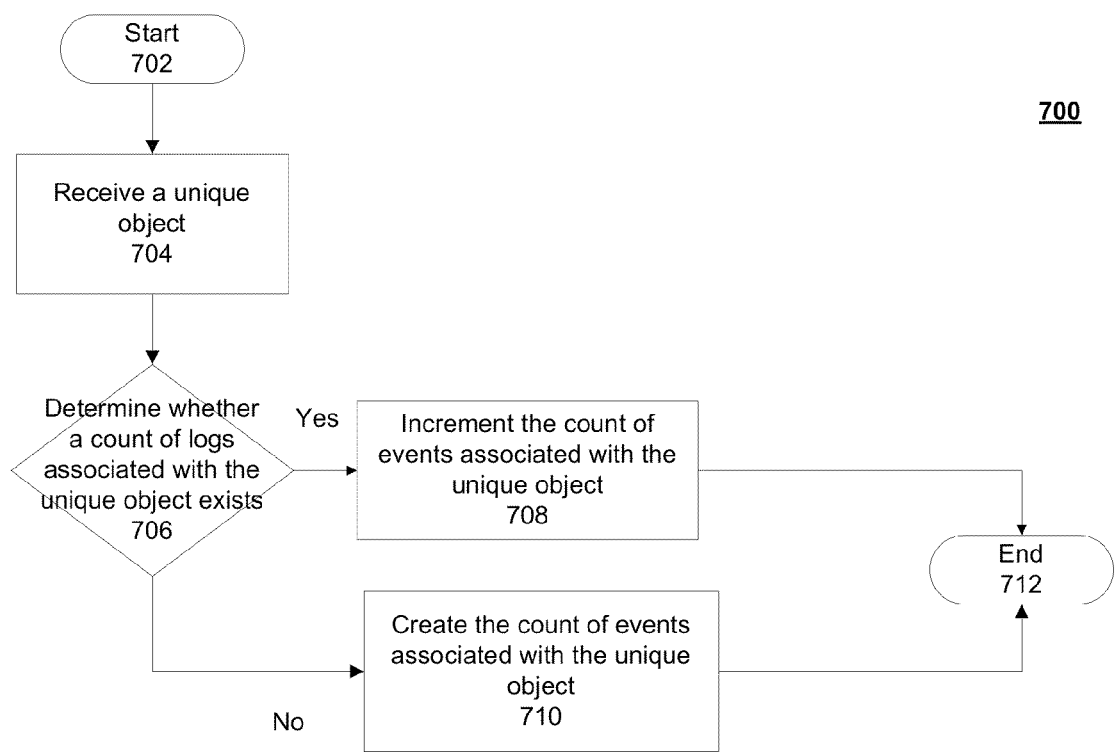
FIG. 7 is a flowchart of a process for incrementing a count associated with a unique firewall rule using the firewall event reduction system of FIG. 3 operable for various embodiments of the disclosure.

With reference to FIG. 7 a flowchart of a process for incrementing a count associated with a unique firewall rule for various embodiments of the disclosure is presented. Process 700 is an example of a process used for the incrementing a count associated with a unique firewall rule using process 400 of FIG. 4.

Process 700 begins (step 702) and receives a unique object (step 704). Process 700 determines whether a count of logs associated with the unique object exists (step 706). Responsive to a determination the count of logs associated with the unique object exists, process 700 increments the count of events associated with the unique object (step 708) and terminates thereafter (step 712).

Responsive to a determination that the count of logs associated with the unique object does not exist, process 700 creates the count of events associated with the unique object (step 710) and terminates thereafter (step 712).

In one alternative embodiment computer-implemented process for determining a rule usage count comprises receiving log messages from each firewall rule whose counts are to be tracked in log collector of a system comprising a rule database containing a record of all firewall rules from each firewall rule whose counts are to be tracked, a route database containing a record of all routing rules from each firewall and each router in a network, a subnet database containing a record of all subnets used on interfaces of each firewall and each router in the network and a topological model created using all routes, devices, and firewall rules on the network, such that a given Internet protocol packet constructed and fed into the topological model behaves as it would on the network; reading all entries in the routing database, the rules database, and the subnet database, to populate several network tries, wherein a trie is created for each of classless inter-domain routing (CIDR) addresses used in a destination field of routes to form a route trie, CIDR addresses present in the subnet database to form an interface trie, for each firewall device, creating a device source trie containing all CIDR addresses used in sources of firewall rules, and destination trie containing all CIDR addresses used in the destination of firewall rules; reading all entries in the rules database, to create a list for each firewall device of source and destination ports and list of protocols used in rules of that device; creating a unique object as each firewall log enters the system, using attributes of a narrowest CIDR network of results from a source IP address lookup in the route trie, the interface trie, and the device source trie; a narrowest CIDR network of results from a destination IP address lookup in the route trie, the interface trie, and the device destination trie; determining whether the source port and/or protocol are present in the log and are also present in the list of ports and protocols used in rules for this device; responsive to a positive determination the source port and/or protocol added to the unique object; responsive to a negative determination a null value is added to the unique object; determining whether a count of logs affiliated with an identifier of the unique object exists in a database mapping unique objects to log counts; responsive to the count of logs affiliated with an identifier of the unique object exists, incrementing a count of events associated with the identifier; responsive to the count of logs affiliated with an identifier of the unique object does not exist, creating a count of logs affiliated with an identifier of the unique object; reading all entries in the database mapping unique objects to log counts into the topological model, wherein a reference to a unique firewall rule on a given device is identified; and incrementing a count affiliated with the unique firewall rule according to the count of logs stored according to the unique identifier.

Thus is presented in an illustrative embodiment a method for firewall rule use counting receives log messages comprising one or more log data sets from each firewall rule in a particular network whose counts are to be tracked in a log collector, generates a network trie for each reference database in a set of databases and a device source trie and a device destination trie for each firewall device in a plurality of devices of the particular network, a source port and protocol list and a destination port and protocol list for each respective device, a unique object for each log data set received; a mapping database comprising an entry for each log data set received associated with the unique object; and feeds each entry in the mapping database through a topology model to also generate a reference to a unique firewall rule on a respective device in the plurality of devices. A count associated with the unique firewall rule is incremented using a count of logs stored associated with the respective unique object and a report is generated.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable data storage device having computer executable instructions stored thereon in a variety of forms. Examples of computer readable data storage devices include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code will include one or more processors coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A method for firewall rule use counting, the method comprising:
receiving log messages comprising one or more log data sets from each firewall rule in a particular network whose counts are to be tracked in a log collector;
generating a network trie for each reference database in a set of databases and a device source trie and a device destination trie for each firewall device in a plurality of devices of the particular network;
generating a source port and protocol list and a destination port and protocol list for each respective device in the plurality of devices;
generating a unique object for each log data set received;

generating a mapping database comprising an entry for each log data set received associated with the unique object;

feeding each entry in the mapping database through a topology model representative of the particular network;

generating a reference to a unique firewall rule on a respective device in the plurality of devices;

incrementing a count associated with the unique firewall rule using a count of logs stored associated with the respective unique object; and generating a report.

2. The method of claim 1 wherein the set of databases further comprises:

a rule database containing a record of all firewall rules from each firewall rule whose counts are to be tracked, a route database containing a record of all routing rules from each firewall and each router in a network, a subnet database containing a record of all subnets used on interfaces of each firewall and each router in the network.

3. The method of claim 1 wherein generating a network trie for each reference database further comprises:

reading all entries in a routing database, a rules database, and a subnet database, to populate several network tries, wherein a trie is created for each classless inter-domain routing (CIDR) addresses used in a destination field of routes to form a route trie, CIDR addresses present in the subnet database to form an interface trie, for each firewall device, creating a device source trie containing all CIDR addresses used in sources of firewall rules, and destination trie containing all CIDR addresses used in the destination of firewall rules;

reading all entries in the rules database, to create a list for each firewall device of source ports and list of protocols used in rules of the respective device; and reading all entries in the rules database, to create a list for each firewall device of destination ports and list of protocols used in rules of the respective device.

4. The method of claim 1 wherein generating a unique object for each log data set received further comprises;

creating a unique object as each firewall log enters the system, using attributes of a narrowest CIDR network of results from a source IP address lookup in the route trie, the interface trie, and the device source trie; a narrowest CIDR network of results from a destination IP address lookup in the route trie, the interface trie, and the device destination trie;

determining whether the source port and/or protocol are present in the log and are also present in the list of ports and protocols used in rules for this device;

responsive to a positive determination the source port and/or protocol added to the unique object; and responsive to a negative determination a null value is added to the unique object.

5. The method of claim 1 wherein generating a reference to a unique firewall rule on a respective device in the plurality of devices further comprises: reading all entries in a database mapping unique objects to log counts into the topological model, wherein a reference to a unique firewall rule on a given device is identified.

6. The method of claim 1 wherein incrementing a count associated with the unique firewall rule using a count of logs stored associated with the respective unique object further comprises:

determining whether a count of logs associated with the unique object exists in a database mapping unique objects to log counts;

responsive to the count of logs associated with the unique object exists, incrementing a count of events associated with the unique object; and responsive to the count of logs associated with the unique object does not exist, creating a count of logs associated with the unique object.

7. The method of claim 1 wherein feeding each entry in the mapping database through a topology model representative of the particular network further comprises:

creating the topological model using all routes, devices, and firewall rules on the particular network, such that a given Internet protocol packet constructed and fed into the topological model behaves as it would on the particular network.

* * * * *